United States Patent [19]
Kimura

[11] Patent Number: 6,069,617
[45] Date of Patent: May 30, 2000

[54] FUNCTION REALIZATION SYSTEM IN INFORMATION PROCESSING EQUIPMENT AND APPARATUS FOR ATTAINING THE SYSTEM

[75] Inventor: Etsuko Kimura, Saitama, Japan

[73] Assignee: NEC Corporation, Tokyo, Japan

[21] Appl. No.: 09/038,169

[22] Filed: Mar. 10, 1998

[30]    Foreign Application Priority Data

Mar. 14, 1997  [JP]  Japan .................................. 9-060545

[51] Int. Cl.⁷ .................................................... G09G 5/00
[52] U.S. Cl. ........................................ 345/172; 345/156
[58] Field of Search ................................... 345/156, 168, 345/169, 172, 507, 508; 341/22, 23

[56]              References Cited

U.S. PATENT DOCUMENTS 4,585,908  4/1986  Smith .
5,373,551  12/1994  Baals et al. .
5,386,460  1/1995  Boakes .

FOREIGN PATENT DOCUMENTS

| 0 576 027 A2 | 12/1993 | European Pat. Off. . |
| 5-80997 | 4/1993 | Japan . |
| 5-34221 | 12/1993 | Japan . |
| 6-208432 | 7/1994 | Japan . |
| 2 319 691 | 5/1998 | United Kingdom . |
| WO 97/31467 | 8/1997 | WIPO . |

*Primary Examiner*—Regina Liang
*Attorney, Agent, or Firm*—Scully, Scott, Murphy & Presser

[57]              ABSTRACT

In a function realization system in an information processing equipment, at least one or plural frequently used functions are previously chosen out of a plurality of predetermined functions to be brought to realization, and a desired function is brought to realization a minimum of access operation.

7 Claims, 1 Drawing Sheet

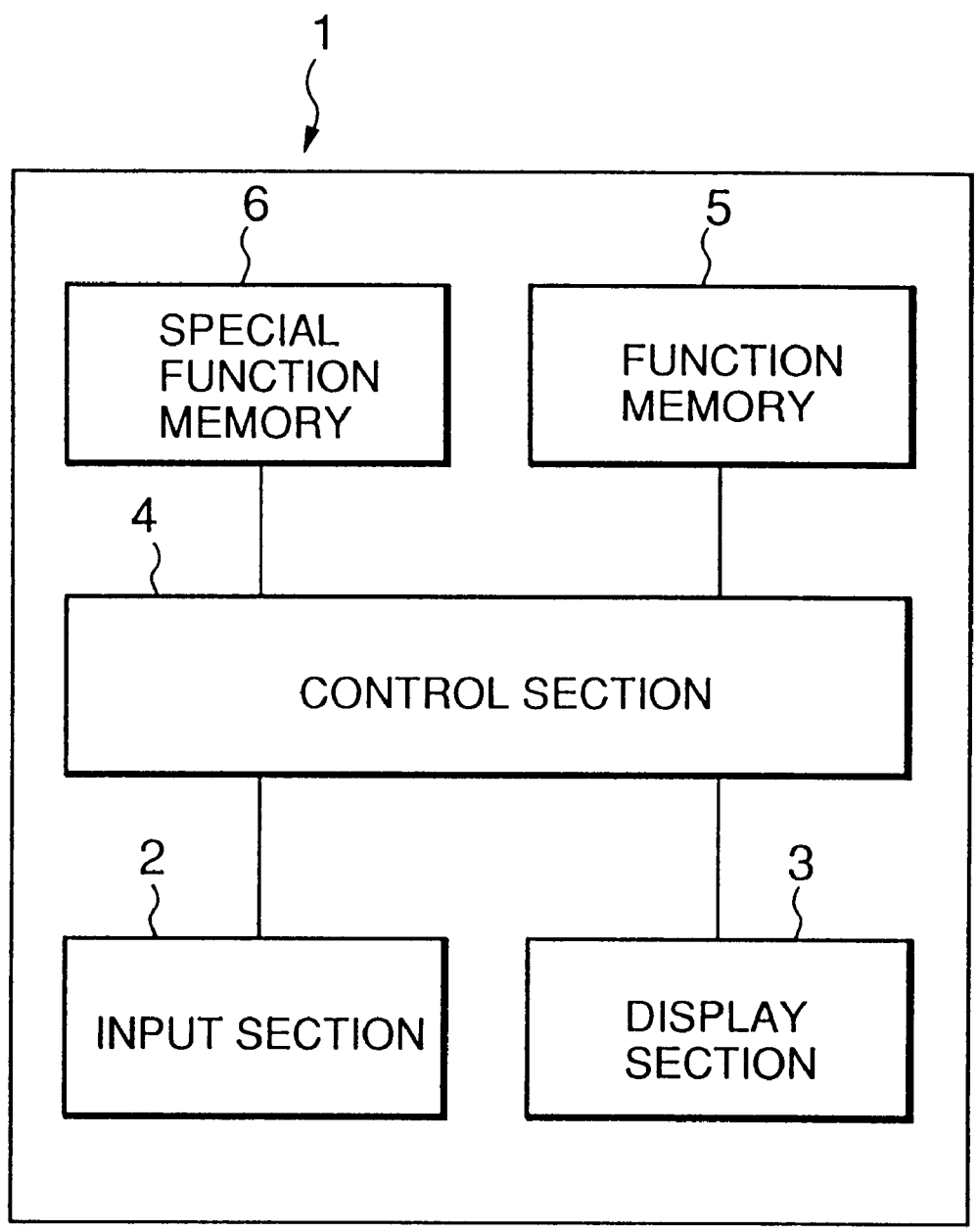
FIGURE

FUNCTION REALIZATION SYSTEM IN INFORMATION PROCESSING EQUIPMENT AND APPARATUS FOR ATTAINING THE SYSTEM

BACKGROUND OF THE INVENTION

1. Field of the Invention

The present invention relates to a function realization system in an information processing equipment and an apparatus for attaining the system and, more particularly, to a function realization system in an information processing equipment which can be adapted to choose a function to be brought to realization out of plural functions previously held in the equipment, and thereby bring the function to realization.

2. Description of the Prior Art

A conventional function realization system of this type in an information processing equipment includes an input device, a display device, a memory device, and a control device. For example, this system is used in an information processing equipment having many functions, like a portable telephone unit, a facsimile apparatus, an electronic filing system, or a composite system equipment using a computer, to choose a function to be brought to realization out of the functions and bring it to realization.

This function realization system in the information processing equipment has windows corresponding to the respective functions. When a given function is to be brought to realization, the user chooses a window corresponding to the desired function out of the windows equal in number to the functions that the equipment holds. The user then performs an operation in accordance with the instructions on the window, thereby bringing the function to realization.

When, therefore, a given function is to be brought to realization, the user must choose the corresponding window out of many functions. As the number of functions set in advance increases, the number of operations required to bring the function to realization increases. As a result, it takes much time to bring the function to realization.

SUMMARY OF THE INVENTION

The present invention has been made in consideration of the above situation in the prior art, and has as its object to provide a function realization system, in an information processing equipment, which can bring a specific function to realization in a multi-functional information equipment without choosing a window corresponding to the function to be brought to realization out of many windows, and can considerably shorten the time required to bring a special function to realization by decreasing the number of required operations even if many functions are held in the information processing equipment.

In order to achieve the above object, according to the first aspect of the present invention, there is provided a function realization system in an information processing equipment comprising previously choosing at least one or plural frequently used functions out of a plurality of predetermined functions to be brought to realization, thereby bringing a desired function to realization with a minimum of access operation.

According to the second aspect of the present invention, in the function realization system in the information processing equipment according to the first aspect, an especially frequently used function is chosen from the plurality of frequently used functions, and when a predetermined mode of the information processing equipment is chosen, the chosen function is brought to realization with a minimum of access operation in the mode.

According to the third aspect of the present invention, there is provided a function realization apparatus in an information processing equipment, comprising:

a function memory storing a plurality of data corresponding to a plurality of predetermined functions to be brought to realization by the information processing equipment;

a special function memory storing a plurality of data, of the plurality of data stored in the function memory, which correspond to one or plural frequently used functions;

an input section for designating the plurality of frequently used functions, and also designating a function to be brought to realization out of the plurality of designated functions; and a control section for choosing a plurality of data corresponding to the plurality of frequently used functions designated by the input section out of the plurality of data stored in the function memory, storing the chosen data in the special function memory, choosing data corresponding to the function to be brought to realization, of the plurality of stored data, which is designated by the input section, and bringing the function corresponding to the chosen data to realization on the basis of the chosen data.

According to the fourth aspect of the present invention, in the function realization system in the information processing apparatus according to the third aspect, the information processing equipment is a multi-functional information equipment obtained by combining various types of information equipments.

According to the fifth aspect of the present invention, in the function realization system in the information processing apparatus according to the third aspect, each of the plurality of data stored in the function memory includes a function name of a function corresponding to each data and a program for bringing the function to realization.

According to the sixth aspect of the present invention, in the function realization system in the information processing apparatus according to the third aspect, an especially frequently used function is chosen from the plurality of frequently used functions, and then a predetermined mode of the information processing equipment is chosen, the chosen function is brought to realization with a minimum of access operation in the mode.

According to the seventh aspect of the present invention, the function realization system in the information processing apparatus according to the third aspect further comprises a display section for selectively displaying various windows required for function realization operations.

As is obvious from the above aspects, according to the function realization system in the information processing equipment according to the present invention, a plurality of data, of a plurality of data corresponding to a plurality of functions stored in the function memory in advance, which correspond to a plurality of frequency used functions, are stored in the special function memory, one of the plurality of functions corresponding to the plurality of data stored in the special function memory is chosen to be brought to realization. A desired function can be brought to realization without choosing a window corresponding to the desired function out of many windows corresponding to the total number of functions held in the information processing equipment.

Even in an information processing equipment having many functions, a given function can be brought to realization with a minimum of access operation within a short period of time.

When the frequently used functions include an especially frequently used function, data corresponding to the especially frequently used function is stored in another area in the special function memory. When a predetermined mode is chosen, a function name corresponding to the especially frequently used function of the plurality of data corresponding to the plurality of frequently used functions is preferentially displayed in a window. The desired function can be chosen and brought to realization with a minimum of access operation.

The above and many other objects, features and additional advantages of the present invention will become manifest to those versed in the art upon making reference to the following detailed description and accompanying drawings in which preferred embodiments incorporating the principles of the present invention are shown by way of illustrative examples.

BRIEF DESCRIPTION OF THE DRAWINGS

FIGURE is a block diagram showing a schematic exemplified feature of a function realization apparatus in an information processing equipment according to the present invention.

DETAILED DESCRIPTION OF THE PREFERRED EMBODIMENT

A preferred embodiment of the present invention will be described below with reference to the accompanying drawing.

FIGURE is a block diagram showing a schematic exemplified feature of a function realization apparatus in an information processing equipment according to the present invention.

This embodiment shown in FIGURE is constituted by a function memory 5 storing a plurality of data corresponding to a plurality of predetermined functions to be brought to realization by a multi-functional information processing equipment 1 such as a portable telephone unit, a facsimile apparatus, an electronic filing system, or a composite system equipment using a computer, a special function memory 6 storing a plurality of data, of the plurality of data stored in the function memory 5, which correspond to a plurality of frequently used functions, an input section 2 for designating a plurality of frequently used functions and designating a function to be brought to realization out of the plurality of designated functions, and a control section 4 for choosing a plurality of data corresponding the plurality of frequently used functions designated by the input section 2 out of the plurality of data stored in the function memory 5, storing the chosen data in the special function memory 6, choosing data corresponding to a function to be brought to realization, which is designated by the input section 2, out of the plurality of data stored in the special function memory 6, and bringing the function corresponding to the chosen data to realization in accordance with the chosen data. Note that FIGURE also shows a display section 3 for displaying various windows required for function realization operations.

The operation of the function realization system in the information processing equipment according to this embodiment will be described in detail next.

Referring to FIGURE, a plurality of data corresponding to a plurality of predetermined functions (an outgoing call function of controlling an outgoing call, an incoming call function of controlling an incoming call, and the like when the information processing equipment 1 is a portable telephone unit) to be brought to realization by the information processing equipment 1 are stored in the function memory 5 in advance. These data include the function names of the functions corresponding to the data and programs for bringing the functions to realization.

When the power supply of the information processing equipment 1 is turned on, the control section 4 causes the display section 3 to display a mode selection window for choosing a mode to be used out of a plurality of modes, e.g., a function realization history display mode of displaying the history information of functions which have been brought to realization, and a function selection mode of calling a function to bring it to realization or registering a frequently used function.

When the operator sees the display section 3 and performs an input operation with the input section 2 to choose the function selection mode, the input section 2 sends a mode selection signal indicating the selection of the function selection mode to the control section 4. Upon reception of the mode selection signal, the control section 4 causes the display section 3 to display the function selection mode window for choosing a "call" mode of calling the function and bringing it to realization or a "registration" mode of registering a frequently used function.

When the operator sees the display section 3 and performs an input operation with the input section 2 to indicate the selection of the "registration" mode, the input section 2 sends a registration mode signal indicating the selection of the "registration" mode to the control section 4. Upon reception of the registration mode signal, the control section 4 causes the display section. 3 to display a registration window in which the function names in the plurality of data stored in the function memory 5 are displayed. When the operator sees the registration window and operates the input section 2 to choose a plurality of frequently used function names out of the plurality of function names displayed in the registration window, the input section 2 sends a registration designation signal for designating a plurality of functions corresponding to the chosen function names to the control section 4. Upon reception of the registration designation signal, the control section 4 chooses a plurality of data corresponding to the plurality of functions indicated by the registration designation signal from the function memory 5, stores the chosen data in the special function memory 6, and causes the display section 3 to display a mode selection window after displaying "registration completion".

When the operator sees the display section 3 and performs an input operation with the input section 2 to indicate the selection of the function selection mode, the input section 2 sends a mode selection signal indicating the selection of the function selection mode to the control section 4. Upon reception of the mode selection signal, the control section 4 causes the display section 3 to display a function selection mode window for choosing the "call" mode or the "registration" mode.

When the operator sees the display section 3 and performs an input operation with the input section 2 to indicate the selection of the "call" mode, the input section 2 sends a call mode signal indicating the selection of the "call" mode to the control section 4. Upon reception of the call mode signal, the control section 4 causes the display section 3 to display a call window in which the function names in the plurality of data stored in the special function memory 6 are displayed. When the operator sees the call window and operates the input section 2 to choose a function to be brought to realization out of the plurality of function names displayed in the call window, the input section 2 sends a call designation signal for designating a function corresponding to the chosen function name to the control section 4. Upon reception of the call designation signal, the control section 4 chooses data corresponding to the function indicated by this call designation signal from the function memory 5, and executes the program in the chosen data, thereby bringing the chosen function to realization.

According to the above description, a plurality of data corresponding to a plurality of frequently used functions, of a plurality of data corresponding to a plurality of functions stored in the function memory 5, are stored in the special function memory 6, and one of the functions corresponding to then plurality of data stored in the special function memory 6 is chosen to be brought to realization. If, however, an especially frequently used function is present, this function may be chosen in advance from a plurality of data corresponding to a plurality of functions stored in the function memory 5. For example, the data corresponding to this chosen function may be stored in another area in the special function memory 6. When the "call" mode chosen in the function selection mode window, this especially frequently used function name may be displayed before the function names in the plurality of data corresponding to the plurality of frequently used functions stored in the special function memory 6 are displayed, thereby allowing the operator to easily choose this function name.

What is claimed is:

1. A function realization system in an information processing equipment comprising means for preselecting and separately storing in a special function memory at least one frequently used function out of a plurality of predetermined functions to be brought to realization, thereby providing a user an ability of bringing the desired separately stored frequently used function to realization with a minimum of access operation.

2. A system according to claim 1, wherein an especially frequently used function is chosen from the at least one frequently used function, and when a predetermined mode of said information processing equipment is chosen, the chosen function is brought to realization with a minimum of access operation in the mode.

3. A function realization apparatus in an information processing equipment, comprising:
   a function memory storing a plurality of data corresponding to a plurality of predetermined functions to be brought to realization by said information processing equipment;
   a special function memory storing a plurality of data, of the plurality of data stored in said function memory, which stored data correspond to at least one of the plurality of frequently used functions;
   an input section for designating the at least one of the plurality of frequently used functions, and also designating a function to be brought to realization out of the at least one of the plurality of designated functions; and
   a control section for choosing a plurality of data corresponding to the at least one of the plurality of frequently used functions designated by said input section out of the plurality of data stored in said function memory, storing the chosen plurality of data in said special function memory, choosing the plurality of data corresponding to the frequently used function to be brought to realization, of the plurality of stored data, which plurality of data is designated by said input section, and substantially immediately bringing the function corresponding to the chosen, function-memory stored data to realization on the basis of the chosen data.

4. An apparatus according to claim 3, wherein said information processing equipment is a multi-functional information equipment obtained by combining various types of information equipments.

5. An apparatus according to claim 3, wherein each of the plurality of data stored in said function memory includes a function name of a function corresponding to each data and a program for bringing the function to realization.

6. An apparatus according to claim 3, wherein an especially frequently used function is chosen from the plurality of frequently used functions, and when a predetermined mode of said information processing equipment is chosen, the chosen function is brought to realization with a minimum of access operation within the mode.

7. An apparatus according to claim 3, further comprising a display section for selectively displaying various windows required for function realization operations.

* * * * *